UNITED STATES PATENT OFFICE.

WALTER KÖNIG, OF ELBERFELD, GERMANY, ASSIGNOR TO FARBENFABRIKEN VORM. FRIEDR. BAYER & CO., OF ELBERFELD, GERMANY.

VIOLET-BLACK AZO DYE.

No. 874,968.　　　Specification of Letters Patent.　　　Patented Dec. 31, 1907.

Application filed August 26, 1907. Serial No. 390,246.

*To all whom it may concern:*

Be it known that I, WALTER KÖNIG, doctor of technical arts, chemist, citizen of the German Empire, residing at Elberfeld, Germany, Kingdom of Prussia, have invented new and useful Improvements in New Azo Dyes, of which the following is a specification.

This invention relates to the preparation of new azo-dyestuffs having the following general formula

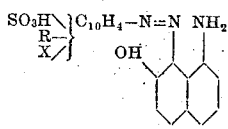

(R stands for hydrogen or a substituent; and X stands for hydrogen or the sulfonic acid group), which dyestuffs can be obtained by combining in alkaline solution the diazocompounds of sulfonic acids of 1-naphthylamin compounds with 1-amino-7-naphthol.

The new dyestuffs are in the shape of their alkaline salts dark powders soluble in water; yielding upon reduction with stannous chlorid and hydrochloric acid sulfonic acids of 1-naphthylamin compounds and 1.8-naphthylene diamin-7-naphthol of the formula:

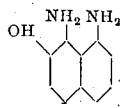

They are very good level acid dyeing colors of strong covering power, producing on wool from brown to deep black shades of good fastness to washing. Cotton checking threads in wool pieces are not dyed by the new colors.

In carrying out the new process practically I can proceed as follows, the parts being by weight: 31.7 parts of 1-naphthylamin-4-sulfonate of sodium are diazotized in the usual manner by means of hydrochloric acid and 7 parts of sodium nitrite. The diazo compound is then added with stirring to a solution of 16 parts of 1-amino-7-naphthol in 4 parts of NaOH and an excess of sodium carbonate solution. The dyestuff is filtered off, pressed and dried. It is, after being dried and pulverized, in the shape of its sodium salt a dark powder soluble in water with a violet color and being soluble in concentrated sulfuric acid with a violet color. By reduction with stannous chlorid and hydrochloric acid 1-naphthylamin-4-sulfonic acid and 1.8-naphthylenediamin-7-naphthol are obtained. The new dyestuff dyes wool from acid baths violet-black shades.

The process is carried out in an analogous manner on using other of the above mentioned diazocompounds.

In the following table the shades on wool of some of the new dyestuffs are given.

| | | |
|---|---|---|
| 1) 1-naphthylamin-2-sulfonic acid | | Deep violet-red. |
| 2) 1-naphthylamin-3-sulfonic acid | | Reddish-violet-black. |
| 3) 1-naphthylamin-4-sulfonic acid | | Violet-black. |
| 4) 1-naphthylamin-5-sulfonic acid | | Violet-black. |
| 5) 1-naphthylamin-6-sulfonic acid | + 1.7-amino-naphthol. | Reddish violet-black. |
| 6) 1-naphthylamin-7-sulfonic acid | | Bluish violet black. |
| 7) 1-amino-2-naphthol-ethylether-sulfonic acid. | | Bluish violet-black. |
| 8) 1-naphthylamin-2.4-disulfonic acid. | | Reddish-brown. |
| 9) 1-naphthylamin-4.7-disulfonic acid. | | Violet-black. |
| 10) 1-naphthylamin-5.7-disulfonic acid. | | Violet-black. |

Having now described my invention and in what manner the same is to be performed, what I claim as new and desire to secure by Letters Patent is:—

1. The herein-described new azo-dyestuffs having the above given formula, obtainable by combining in alkaline solution sulfonic acids of 1-naphthylamin compounds with 1-amino-7-naphthol, which dyestuffs are, after being dried and pulverized, in the shape of their alkaline salts dark powders soluble in water; yielding upon reduction with stannous chlorid and hydrochloric acid sulfonic acids of 1-naphthylamin compounds and 1.8-naphthylenediamin-7-naphthol; and dyeing wool from acid baths generally from brown to black shades, substantially as described.

2. The herein-described new azodyestuff obtainable by combining in alkaline solution the diazo compound of 1-naphthylamin-4-sulfonic acid with 1-amino-7-naphthol, which dyestuff is, after being dried and pulverized, in the shape of its sodium salt a dark powder soluble in water with a violet color and being soluble in concentrated sulfuric acid with a violet color; yielding upon reduction with stannous chlorid and hydrochloric acid 1-naphthylamin-4-sulfonic acid and 1.8-naphthylenediamin-7-naphthol; and dyeing wool from acid baths violet-black shades, substantially as described.

In testimony whereof I have hereunto set my hand in the presence of two subscribing witnesses.

WALTER KÖNIG.

Witnesses:
 OTTO KÖNIG,
 WILLY DRINHAUS.